United States Patent [19]

Karazim et al.

[11] Patent Number: 4,499,691
[45] Date of Patent: Feb. 19, 1985

[54] JET PUMP BEAM BOLT RETAINER CUTTER

[75] Inventors: Michael P. Karazim; Bob Y. Okashima, both of San Jose; John J. Ashburn, Livermore, all of Calif.

[73] Assignee: General Electric Company, San Jose, Calif.

[21] Appl. No.: 411,307

[22] Filed: Aug. 25, 1982

[51] Int. Cl.³ .................................. B24B 19/00
[52] U.S. Cl. .................................. 51/241 S
[58] Field of Search .............. 51/241 S, 241 R; 83/745, 925 R; 125/14

[56] References Cited

U.S. PATENT DOCUMENTS

| | | | |
|---|---|---|---|
| 1,946,390 | 2/1934 | Christiansen | 83/745 |
| 3,848,371 | 11/1974 | Dillinger | 51/241 S |
| 4,318,391 | 3/1982 | Wachs et al. | 125/14 |
| 4,383,394 | 5/1983 | Qurnell et al. | 51/241 S |

Primary Examiner—Roscoe V. Parker
Attorney, Agent, or Firm—Ivor J. James, Jr.; Raymond G. Simkins; Samuel E. Turner

[57] ABSTRACT

An apparatus for underwater separation of a jet pump beam from the inlet mixer of a jet pump in a nuclear reactor system. The apparatus underwater cuts a retaining piece coupling the beam with the inlet mixer.

26 Claims, 7 Drawing Figures

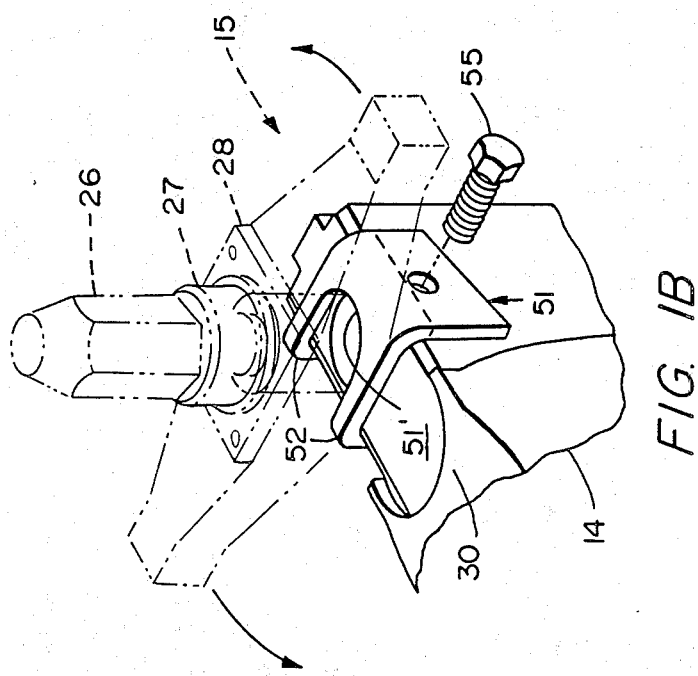
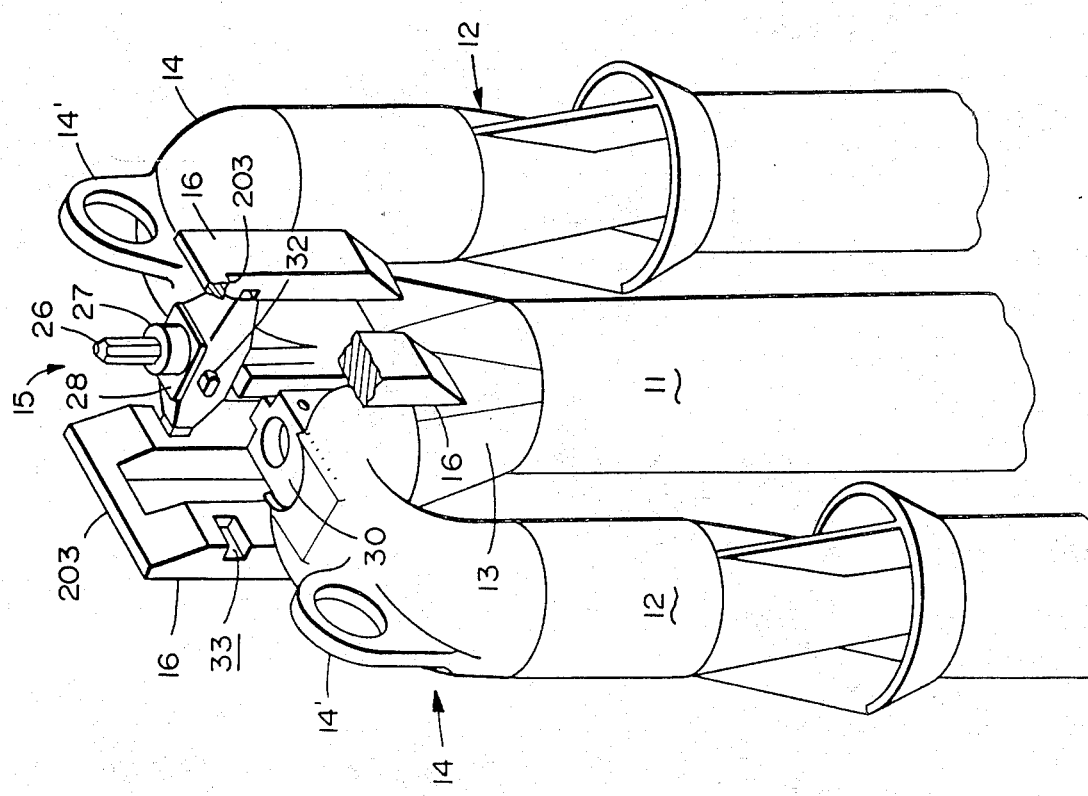

JET PUMP BEAM BOLT RETAINER CUTTER

BACKGROUND OF THE INVENTION

This invention relates to the underwater cutting and partial removal of a jet pump beam bolt retainer used in the pressure vessels of certain kinds of nuclear reactors for securing the jet pump beam of a jet pump assembly during initial reactor equipment assembly. These retainers interfere with the separate removal of the jet pump beam and beam bolt, that is without simultaneously removing other significant jet pump assembly parts.

Many kinds of nuclear reactors, in particular boiling water reactors, employ jet pumps to circulate cooling water or moderator fluid through the core within the pressure vessel of the reactor. During servicing outages of the reactor, it is on occasion desirable to remove and replace the jet pump beam and certain associated pieces of equipment without removing more pieces than is necessary. This may for example occur when cracking has been detected in the jet pump beam.

Information regarding the role of the jet pump beam in securing the upper portion of the jet pump assembly is provided in a below-referenced patent application to the assignee herein, General Electric Company. This patent application is entitled "Ultrasonic Method and Apparatus" and has a U.S. Patent and Trademark Office Ser. No. 220,431 and a filing date of Dec. 29, 1980 now U.S. Pat. No. 4,394,345. This application is hereby expressly referred to and incorporated herein.

A boiling water reactor may employ as many as twenty downwardly directed jet pumps to circulate reactor water through the core of the reactor pressure vessel. The jet pumps receive water from an inlet riser and pass the water through a pipe elbow or mixer to a jet pump nozzle, as shown for example in U.S. Pat. Nos. 3,378,456 and 3,389,055, both assigned to General Electric Company and incorporated herein. Each pipe elbow or mixer is held in position by a jet pump beam, which will be described in substantial detail hereinafter.

OBJECTS OF THE INVENTION

Accordingly, it is an object of the invention set forth herein to improve the servicing of nuclear reactors by enabling the removal of the jet pump beam without unnecessary removal of other major components of the jet pump assembly such as for example the inlet mixer of the jet pump assembly.

Another object of the invention is to conveniently separate the jet pump beam and the inlet mixer to which the beam is coupled during initial reactor equipment assembly with a retainer piece extending over a circumferential flange of the jet pump beam bolt.

Another object of the invention is to conduct an underwater holding, cutting and removal operation with respect to a retaining piece of the jet pump assembly which secures the jet pump beam and beam bolt to the inlet mixer. This entails cutting the retaining piece into parts, one of which is left mounted onto the inlet mixer, and the other of which is removed with the jet pump beam and the cutting apparatus toward which this invention is directed.

It is a further object to conduct a cutting, holding and removal operation with respect to the jet pump beam and its retaining piece with a tool capable of conveniently mounting the inlet mixer and the transition piece receiving water from an input riser of the jet pump assembly.

Another object of the invention herein is to conduct a cutting operation underwater upon a jet pump beam retaining piece with a cutting apparatus maneuvered into place at the end of a line or wire, which is likely to involve minor collisions, jostling and buffeting with other reactor equipment.

A further object of the invention is to provide a remotely adjustable and controllable underwater cutting apparatus employing an air-powered rotating shaft and motor for driving the shaft and a circular cutting blade, the cutting apparatus including a fixedly seatable and a movable portion having a cutting range of travel sufficient to cut through the retaining piece for the jet pump beam.

SUMMARY OF THE INVENTION

The invention herein involves a cutting apparatus for mounting on the inlet mixer and transition piece of the jet pump assembly of a nuclear reactor employing jet pumps for circulating water or moderator fluid through the reactor core residing in a pressure vessel. Aside from the apparatus being able to mount the jet pump assembly, the cutting apparatus according to this invention is able to position the cutting blade or wheel adjacent to a retaining piece for the jet pump beam, which connects the jet pump beam of the jet pump assembly with the inlet mixer. This connection facilitates initial reactor assembly, since it enables the jet pump beam to be mounted on the inlet mixer before the mixer is lowered into place within the pressure vessel of the nuclear reactor, but this has disadvantages later during reactor outages and servicing, when it is on occasion desirable to remove the jet pump beam and associated elements from the reactor pressure vessel without taking the inlet mixer out as well. So it follows that it is useful to have a cutting apparatus which eliminates the holding action of the mixer-mounted retaining piece on the jet pump beam. This invention accomplishes that goal by cutting the retainer into pieces while concurrently holding onto the cut-off piece of the retainer, preventing it from falling loosely to the bottom of the pressure vessel and otherwise interfering with reactor operation.

The cutting of the retainer piece is conducted by first mounting the cutting apparatus onto the inlet mixer and transition piece, and then adjusting the height or vertical position of the cutting blade. Additionally, the aspect of the jet pump beam has to be rotated 90 degrees to present the cutting tool with a proper orientation of the beam to permit cutting of the retainer. The cutting blade is initially positioned at the beginning of a limited sweep range or run which will carry it entirely through the width of the retainer, severing it into two sections.

The cutting apparatus has a fixedly mountable baseplate which fits for mounting onto the top of the inlet mixer and the transition piece. It includes as well a horizontally movable platform on which the cutting blade is mounted. This movable platform is slidably mounted on the baseplate, as by a dove-tail slide. An air-driven motor for the cutter, which is mounted on this movable platform, supports the cutting blade. A gear arrangement is provided for altering or adjusting the height of the cutting blade.

The height of the cutting blade is routinely setable by maneuvering a pole-socket tool or arrangement from a remote location and extending it into the pressure vessel. The pole/socket arrangement has a lower end or socket fitting onto a rotatable bolthead on the cutter, which can be rotated to set the level of the blade. A similar or the same pole/socket arrangement can be employed to control the cutting movement of the blade through the retainer. This is accomplished by rotating another bolthead which is connected through gears to act upon a rack, effectively transporting the movable platform forward or in reverse upon the slide referred to above. After cutting is completed, the cutter apparatus can be withdrawn from the reactor pressure vessel while still clamped to and holding the jet pump beam and the cut-off portion of the retainer piece.

DRAWING OF A PREFERRED EMBODIMENT

The drawing included herewith is effective for enabling an understanding of the invention toward which the disclosure is directed, and this drawing comes in several figures wherein:

FIG. 1A is an isometric rendering of the upper portion of a jet pump assembly which can be found within the pressure vessel of many a nuclear reactor.

FIG. 1B effectively blows up a portion of FIG. 1A for emphasis and greater clarity and shows in substantial detail the structure of the retainer piece which is of interest herein, since this piece holds the jet pump beam onto the remainder of the jet pump assembly and it is this piece which is cut (at the dotted line shown) to permit independent withdrawal of the jet pump beam from the remainder of the jet pump assembly during reactor outage and servicing. The bolt holding the retainer in place on the inlet mixer is shown in a withdrawn position.

DESCRIPTION OF A PREFERRED EMBODIMENT

Figure 2:
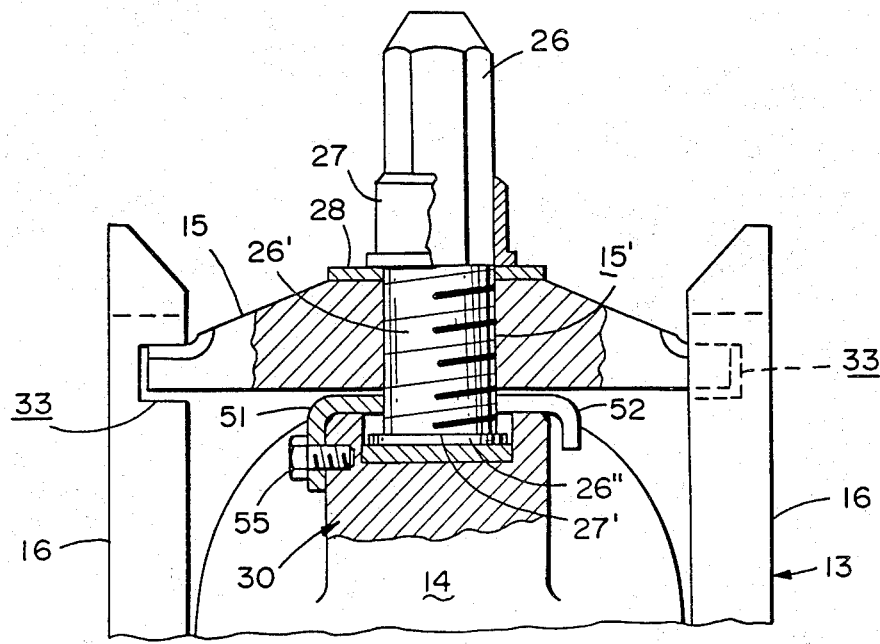
FIG. 2 shows the jet pump beam mounted on the inlet mixer between arms of the transition piece. The retainer piece is shown mounted on the inlet mixer as well.

Shown in FIG. 1A there is a jet pump or piping arrangement including an inlet riser 11 which individually supplies driving water to each of a pair of jet pump nozzles 12 through a transition piece 13 and a corresponding inlet mixer or elbow 14. An end-mounted jet pump beam 15 is positioned between each pair of two arms 16 extending from the transition piece 13 for holding a corresponding one of the inlet mixers 14 in place.

The jet pump beam 15, the arms 16, the inlet mixer 14, and the transition piece 13 are all part of the jet pump assembly shown in FIG. 1A. Further details as to the construction and operation of such jet pumps are given in the previously mentioned U.S. Pat. Nos. 3,378,456 and 3,389,055 which are incorporated herein by reference.

The jet pump beam 15 as shown in FIG. 2 includes a beam bolt 26, a sleeve lock or keeper 27, and weld plate 28 suitably fixedly mounted on the beam 15. The beam 15 includes a raised central portion and trunions 32. The ends of the beam 15 are supported in notches 33 of arms 16 of the transition piece 13. The bolt 26 includes a multisided head, threaded sides 26', and a butt end including a lower bearing or engaging surface 27', which bears against a shoulder 30 of the inlet mixer 14 (FIG. 1) of the jet pump assembly.

The beam bolt 26 passes through both the sleeve lock or keeper 27 and the weld plate 28, but whereas the weld plate 28 does not inhibit the bolt 26 from turning, the sleeve lock or keeper 27 slides snugly over the multisided head of the beam bolt 26, and (after the bolt 26 is tightened) is tack-welded onto the weld plate 28 to prevent bolt 26 from loosening. The bolt 26 is threaded vertically through an aperture 15' of the beam 15 and applies an upward force on the beam 15. The weld plate 28 shown in FIG. 2 is flat and is suitably affixed onto the top of the beam 15.

During initial equipment assembly of the nuclear reactor, the jet pump assembly is built with the jet pump beam 15 already mounted or coupled onto the inlet mixer 14. The required connection is made by the retainer 51 shown in FIGS. 1B and 2 and mounted on the inlet mixer 14.

The retainer 51 is a piece of metal defining a receiving bay 51' and fingers 52 extending forth to define the sides of the bay. The retainer 51 horizontally engages the lower edge of the jet pump beam bolt 26 which has a widened portion or circumferential flange 26" or laterally flanged lower circumference for cooperating with the underside of the retainer 51 in a holding action. The retainer 51 is suitably mounted by a vertical portion thereof on the shoulder 30 of the inlet mixer 14 providing a horizontal bearing surface as shown in FIG. 1B. One way to mount the retainer 51 is to employ a bolt 55.

Figure 3:
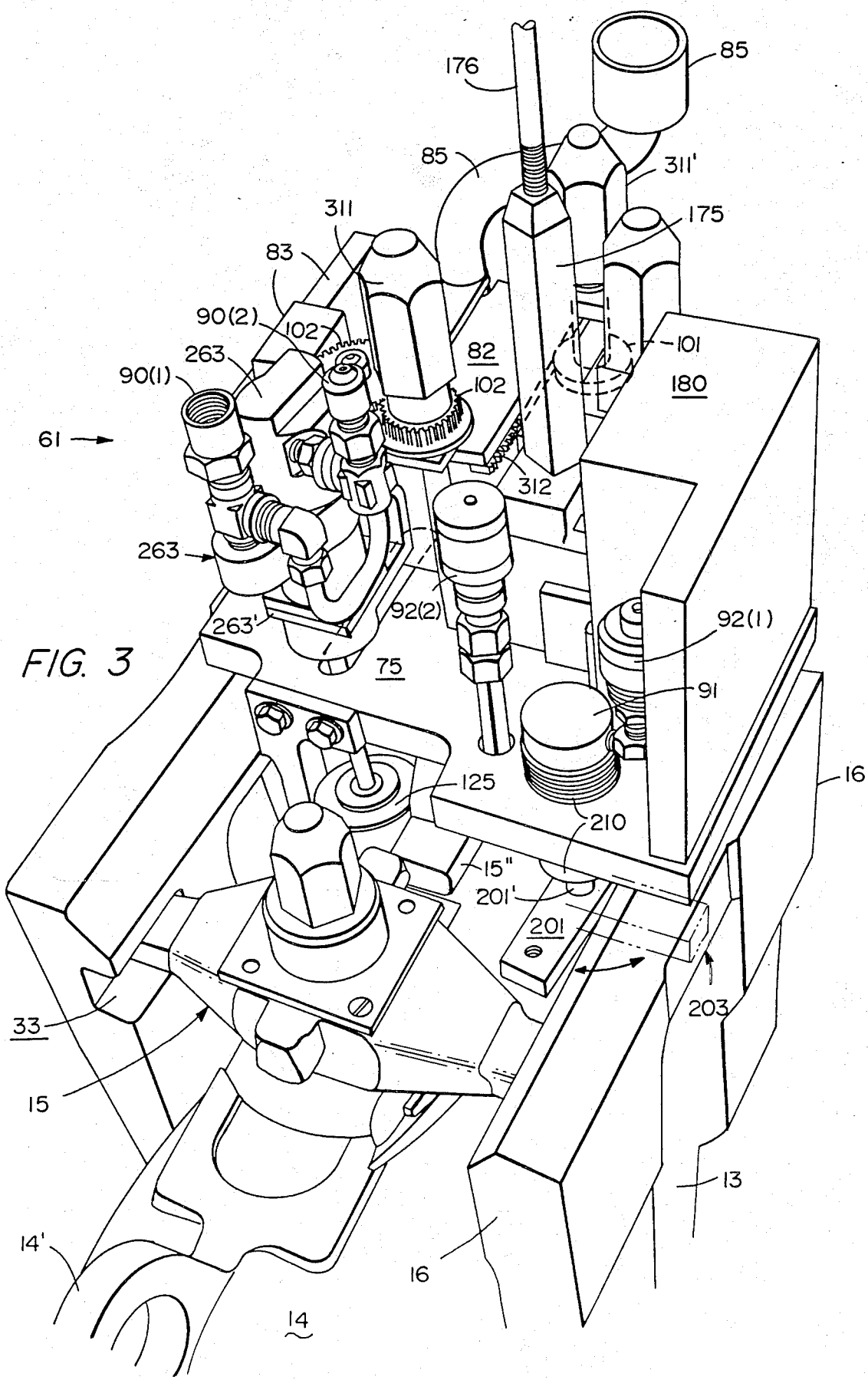
FIG. 3 is an oblique top perspective view of the cutting apparatus mounted on the jet pump assembly of a nuclear reactor.
Figure 4:
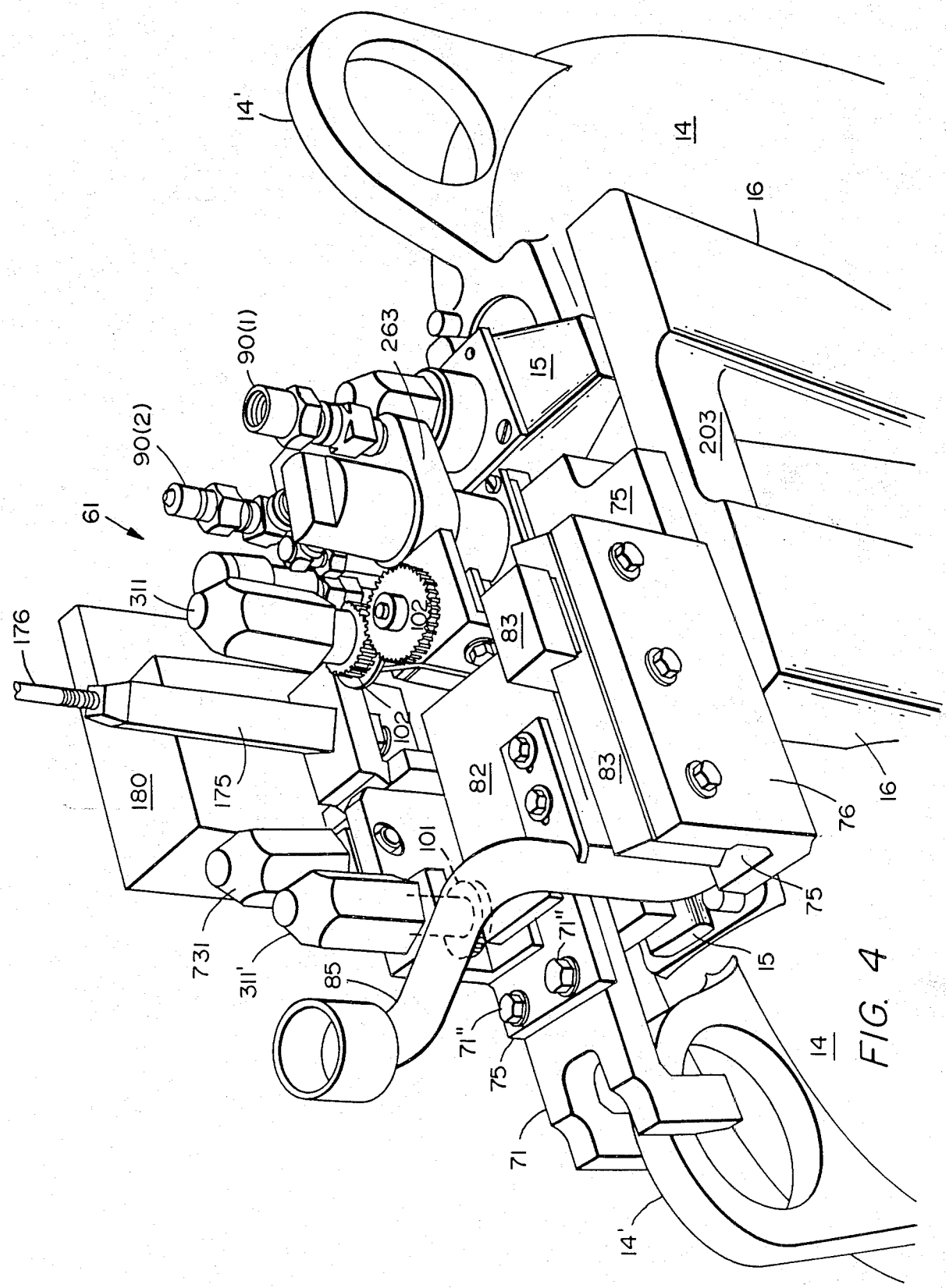
FIG. 4 shows another top view in perspective of the cutting apparatus mounted on the jet pump assembly.
Figure 5:
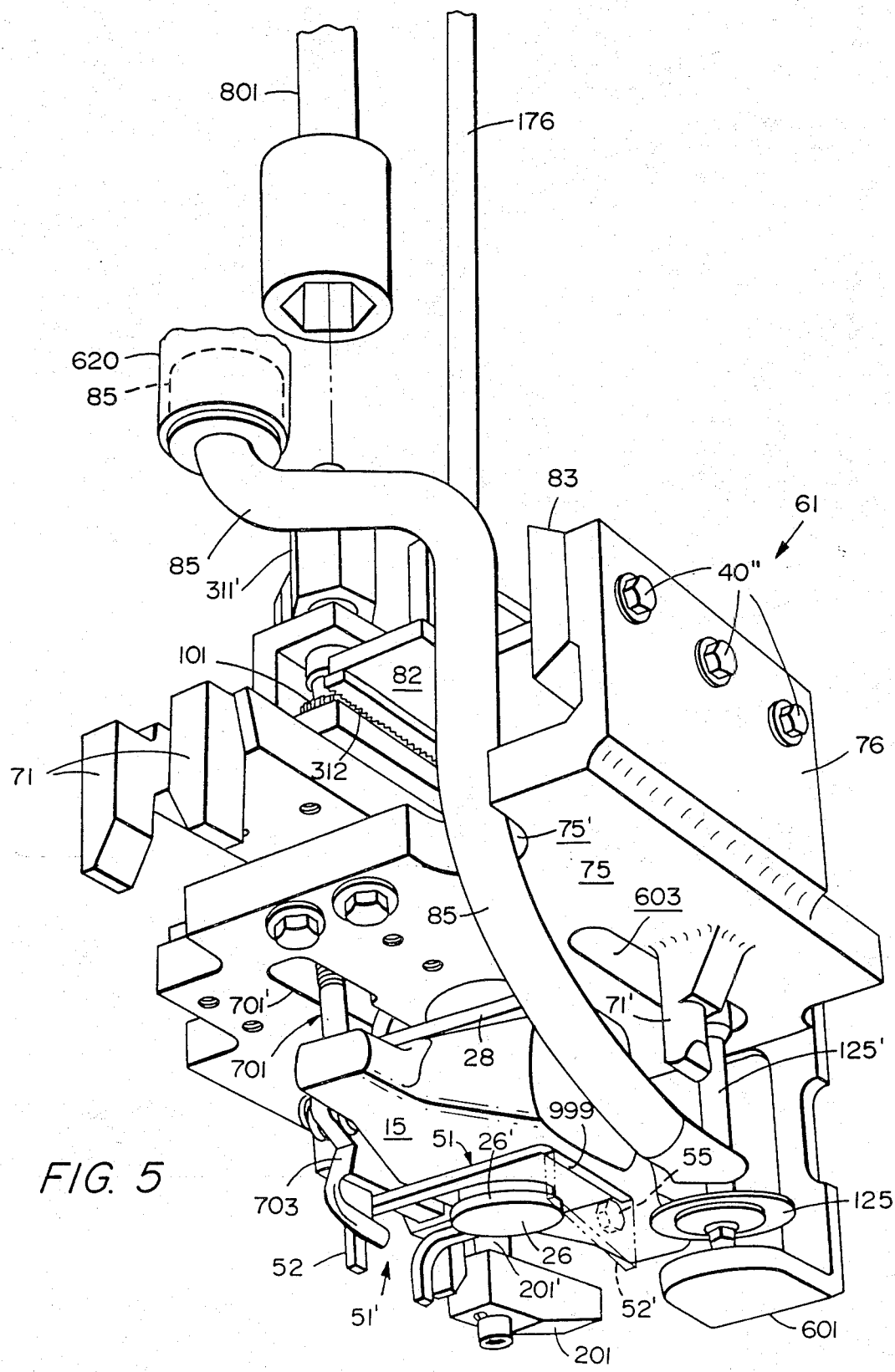
FIG. 5 shows the underside of the cutting apparatus hanging from a line remotely positionable by an operator at a location external to the pressure vessel. The cutting apparatus is shown coupled to the jet pump beam and the cut-off portion of the retainer piece, with the remainder of the retainer piece shown in phantom.
Figure 6:
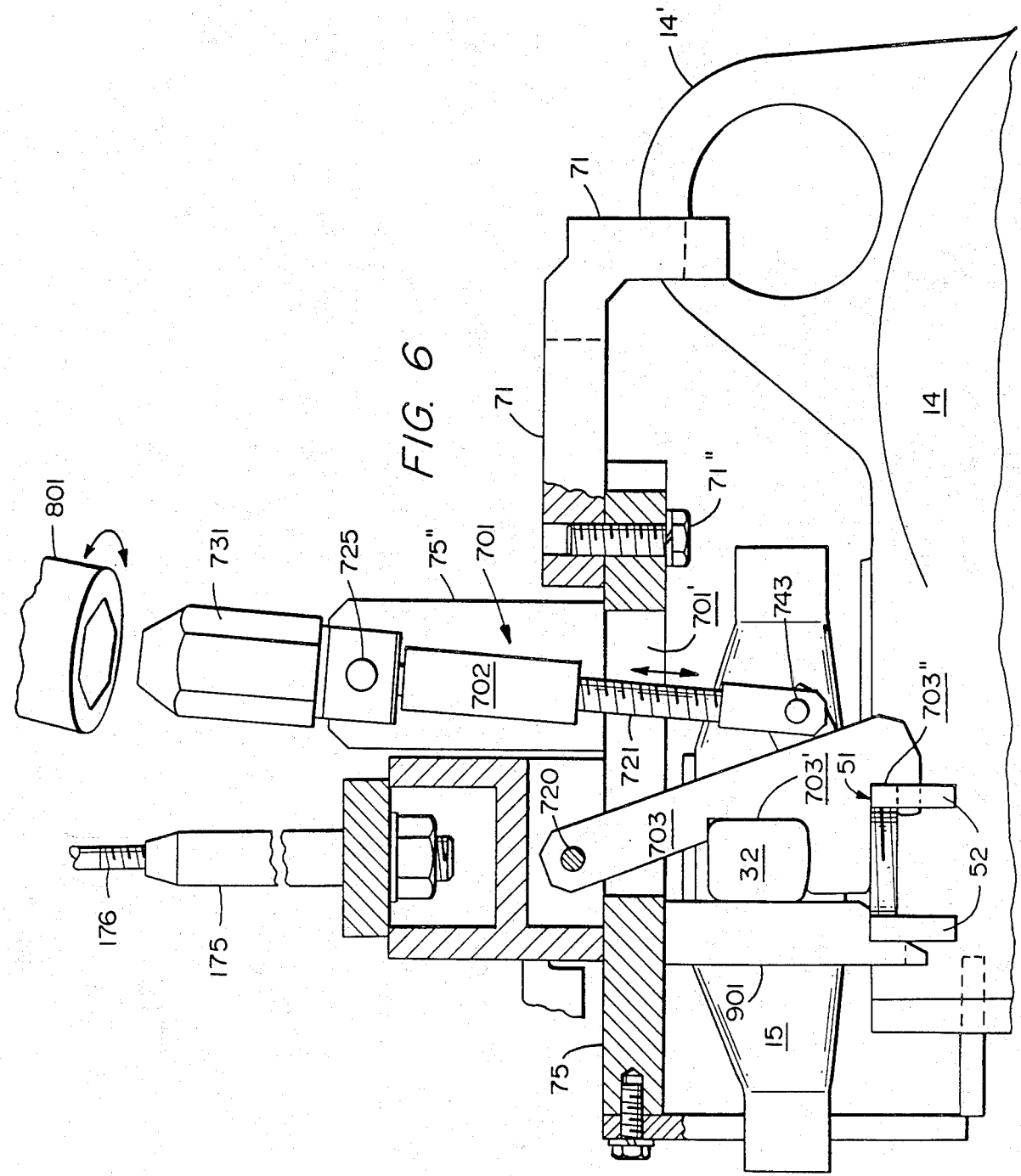
FIG. 6 shows a cross section of the cutting apparatus displaying the latching mechanism which holds onto a trunion of the jet pump beam and secures the cut-off portion of the retainer onto the cutting apparatus.

FIGS. 3 and 4 provide useful views of the cutting apparatus or cutter 61 from above according to a preferred embodiment of the invention toward which this disclosure is directed. Cutter operation requires that the beam 15 be rotated 90 degrees about the axis of its bolt 26 from its normal installed position in engagement with slots 33 in arms 16. The view in FIGS. 3 and 4 shows an exposed beam 15 not subject to cutting as well as an end 15" of another beam 15 immediately under the cutting apparatus 61. The cutter 61 blocks a direct view of the retainer 51 to be cut but this is shown in FIGS. 5 and 6 discussed below. The beam end 15" has been rotated to permit cutting.

Note at this point in FIG. 4 that the ears 14' of the inlet mixer 14 extend upwardly permitting the cutter 61 to be aligned with respect to one of them by an aligning extension 71 suitably mounted as by bolts 71" onto a baseplate 75 (see FIG. 3) of the cutter 61. The baseplate 75 has an upward extension 76 which supports a horizontally movable motor platform 82 along dovetail slide 83. On this motor platform 82 are mounted a suction pipe 85 and air outlet or exhaust and inlet pieces respectively at 90(1) and 90(2) (refer to both FIGS. 3 and 4 as appropriate) and respective gears 101 and 102 for moving the motor platform 82 along the slide 83 as well as for moving a rotary or rotating cutting blade or wheel 125 of cutter 61 up and down with respect to the motor platform 82 as will be shown. Also shown, mounted on baseplate 75 are a hydraulic cylinder 91, and hydraulic couplers or connections or outlet and inlet pieces referred to respectively as ports 92(1) and 92(2).

Also mounted on the baseplate 75 is an upwardly extended structure 175 which connects to a line or wire rope or other kind of supporting means 176 for lowering and lifting the cutter 61 respectively into and out of place in the pressure vessel. FIG. 3 also shows a counterweight 180 for balancing the cutter 61.

As shown in FIG. 3, latch or lever 201 can be inserted under beam 203 between arms 16 of transition piece 13. Lever 201 rotates about shaft 201' which can be clamped upward as part of a hydraulic swing clamp and cylinder device 210 (Enerpac model #RWR-11 for example). This device 210 is actuated in turn by a hydraulic power pump (not shown) also manufactured by Enerpac, in this case under model number PES3042. Attached to the pump to regulate the hydraulic supply are two hydraulic pressure gauges and two hydraulic pressure control valves, neither of which are shown. These valves are used to regulate the pressure to the hydraulic swing cylinder through hydraulic ports 92(1) and 92(2), which is limited to no more than 3000 psi.

Also shown in FIG. 3 is an air motor 263 which is a standard off-the-shelf air motor, in this case preferably a reversible air motor manufactured by the Aro Corporation under model number 7806-1B. The air flow to this motor is through air inlet pieces 90(2) and exhaust 90(1) and is regulated by an air filter regulator/lubricator combination (not shown) manufactured by the C. A. Norgren Company. The model number of this unit is P48-420-83NA. The motor 263 is suitably mounted on a support 263' which is vertically movable with respect to the horizontally movable platform 82 in response to rotating bolthead 311 and gears 102 as for example with a pole/socket arrangement 801 similar to the one shown in FIG. 5.

FIG. 3 additionally shows the cutting blade or wheel 125 of the cutter 61, which is preferably diamond-impregnated for ease of cutting. The wheel 125 is manufactured by Keen Cut Products under designation 601100MP. Its dimensions are 2½ inch OD, ⅝ inch ID, and 0.035 inch in thickness. The retainer piece 51 to be cut by the cutter device 61 is not conveniently apparent in FIG. 3. Thus refer to FIG. 5, which shows the underside of the cutter 61 clamped onto beam 15 and the retainer piece 51.

In FIG. 5 there is shown the baseplate 75 for the cutter apparatus 61. The suction pipe 85 is mounted on the motor platform 82. Prominently shown is the baseplate 75 with the side support 76 mounted thereon as by welding. This supports the dovetail slide 83 as by bolts 40", one side of the slide 83 being shown. A portion of the underside of the motor platform 82 is shown as well, with a rack 312 in engagement with gear 101 for providing horizontal movement to the platform 82. Extension 71 from the baseplate 75 is mounted during operation on ear 14' of the inlet mixer 14, as already noted above. Extension 71' is effective for seating the cutter 61 on the arms 16 of the transition piece 13. The suction tube 85, suitably mounted on the motor platform 82, extends to the region of the cutting wheel 125 to suck particles and other materials created by cutting away from the scene of cutting. The suction tube 85 maintains its spaced relationship with respect to the cutting wheel 125, which is necessary for effective withdrawal of these materials during cutting operation. A suitable hose 620 or other suitable source of suction is applied at the top end of the suction tube 85 to establish the necessary fluid circulation. The spacing between suction tube 85 and cutting wheel 125 is maintained by their being mounted on the motor platform 82 fixedly with respect to each other. A bay 75' in the underside of the baseplate 75 accepts the suction tube to a starting position for cutting.

A corresponding slot 603 in the baseplate 75 extends from the starting position of the cutting wheel 125 and shaft 125' to its location of maximum horizontal extension, and the slot 603 accordingly defines the range of a cutting sweep. Extension 601 serves as a guard for the cutting wheel 125.

Note that the jet pump beam 15 in FIG. 5 is 90 degrees out of normal installed position on the jet pump assembly including the transition piece 13 and mixer 14 and accordingly does not obstruct the cutting of the retaining piece 51. The cut-off portion 52' of the retaining piece 51 is shown in phantom, along with the bolt 55 that keeps the cut-off portion 52' mounted onto the shoulder 30 of the inlet mixer 14.

The retaining piece 51 is latched onto the underside of the cutting device 61 as shown in FIG. 6 by a latching member 701 extending through slot 701'. The latching member 701 includes an expandable linkage or bolt/rod assembly 702 which can be operated by rotating bolthead 731. This draws the threaded shaft 721 obliquely upward or downward, depending upon the direction in which bolthead 731 is turned. The latching member 701 is pivotally mounted at a pivot 725 on an extension 75" of the baseplate 75 to accommodate the movement of an extension piece or pivotally mounted vertical plate 703 about a pivot 720 of its own on the baseplate 75. The bolthead 731 can be turned by a suitable pole/socket arrangement 801 as suggested in the drawing. The extension piece 703 defines vertically spaced bays 703' and 703" which respectively engage in latching action with the trunion 32 of the beam 15 and with retaining piece 51 for holding, cutting and removal thereof. Extension 703 clamps onto trunion 32 and retaining piece 51 against another extension piece 901 for lateral support.

For the cutter 61 to be used according to the instant invention, the beam 15 associated with the retaining piece 51 to be cut is rotated 90 degrees out of normal installed orientation and the cutter 61 is lowered underwater into the pressure vessel by the line or wire rope 176 for mounting on the jet pump assembly and in particular upon the transition piece 13 and the inlet mixer 14. The ears 14' of the inlet mixer 14 engage the aligning extension 71, and the arms 16 of the transition piece 13 provide support to the cutter 61 preferably through the extension 71 shown in FIG. 5. Latch 201 shown in FIGS. 3 and 5 clamps under beam 203 between arms 16 prior to the initiation of cutting. Then by a similar pole/socket arrangement 801, bolthead 731 is engaged rotatably to close extension 703 onto trunion 32 and to secure retainer 51 for cutting. The cutting wheel 125 is fully withdrawn for horizontal cutting to the position as shown in FIG. 5, and its height is remotely adjusted with pole/socket arrangement 801 shown in FIG. 5 by rotating the bolthead 311 and gears 102.

Once vertical adjustment has been completed, the cutting wheel can be translated horizontally for cutting through the vertical portion of the retaining piece 51 along line 999 shown in FIG. 5. This would take the shaft 125' of cutting wheel 125 along a path defined by slot 603 and would sever the retaining piece 51 into sections, one of which pieces would remain fixed in place as a mounted portion by bolt 55 on the inlet mixer 14, and the other of which pieces is thereby conveniently removable in conjunction with the removal of the beam 15 and the cutter 61 itself after unlatching of latch 201. During withdrawal of the cutter 61 from the pressure vessel, the cut-off portion of the retaining piece 51 cooperates with the circumferential flange 26" of the beam bolt 26 to hold beam 15 onto the underside of the cutter 61, which continues to hold onto the retaining piece 51 with extension 703.

The foregoing description is susceptible of reasonable modifications that may occur to those skilled in the art. However, this invention is not meant to be limited to the embodiment just shown and described. The claims set forth the inventive concepts and are intended to cover all modifications coming within the spirit and scope of the invention described herein.

What is claimed is:

1. A cutting apparatus for mounting onto a jet pump assembly in a nuclear reactor system including a transition piece and an inlet mixer, said transition piece effective for receiving water from an inlet riser and for routing at least a portion of said water to a single inlet mixer of said jet pump assembly, said inlet mixer being effective for engaging a jet pump beam including trunions and a beam bolt defining a laterally flanged lower circumference effective for securing said inlet mixer, said transition piece including arms joined at their upper ends by beam means for joining said arms and defining notches for engaging in holding action with the ends of said jet pump beam, said inlet mixer defining a surface against which the beam bolt is bearable near its lower circumference and including vertical sides straddlingly adjacent said surface, said inlet mixer being coupled together at initial assembly with a retaining piece including vertical and horizontal portions, one of said vertical portions being fixedly mounted on one of said vertical sides and including other arms for holding engagement with said beam bolt, said cutting apparatus being seatable on said inlet mixer and transition piece with said jet pump beam rotated 90 degrees out of normal installed position to permit cutting operation, said cutting apparatus comprising a baseplate including mounting extensions for respectively being supported upon said inlet mixer and by the arms of said transition piece, further comprising a first latch means mounted on said baseplate for securing said cutting apparatus onto said jet pump beam and said retaining piece, and horizontal means for horizontally translating on said baseplate, said horizontal means including cutting means for cutting including wheel means for cutting through said retaining piece along a horizontal line, and vertical means for positioning said cutting means vertically at said horizontal line, said horizontal means being effective for horizontally translating said wheel means along said horizontal line for cutting through said retaining piece, whereby the portion of said retaining piece being fixedly mounted onto said transition piece is separated from the remainder thereof.

2. The cutting apparatus of claim 1, comprising a second latch means for coupling said cutting apparatus onto said transition piece.

3. The cutting apparatus of claim 1, wherein said first latch means comprises a pivotally mounted extension from said baseplate extending through a slot in said baseplate, said pivotally mounted extension defining respective vertically spaced bays oriented toward a bearing extension from said baseplate, one of said bays effective for capturing a trunion of said jet pump beam and another of said bays effective for capturing said retaining piece and holding said jet pump beam and said retaining piece in a spaced relationship for cutting, said pivotally mounted extension being pivotally mounted on said baseplate and being remotely positioned by a baseplate-mounted bolt/rod assembly acting obliquely on said pivotally mounted extension, whereby said pivotally mounted extension bears against said trunion and said retaining piece toward said bearing extension for capture.

4. The cutting apparatus of claim 1, wherein said wheel means is a rotary blade mounted at the end of a shaft coupled to an air-driven motor mounted on said horizontal means, and said horizontal means being dovetail slide-mounted on said baseplate, and the rotating shaft of said air-driven motor extending through a slot defined in said baseplate.

5. The cutting apparatus of claim 4, wherein said baseplate includes a guard extension for protecting said wheel means.

6. The cutting apparatus of claim 1, wherein the horizontal position of said horizontal means is remotely controllable by the operation of a pole/socket arrangement, and said horizontal means is position settable by a rack and pinion gear arrangement including a bolthead engagable with said pole/socket arrangement for advancing the position of said horizontal means.

7. A remotely position-settable and controllable cutting apparatus for mounting a piping arrangement for cutting off a severable portion thereof, said cutting apparatus comprising a seatable structure including a latching portion to latch onto the severable portion of the piping arrangement, whereby said severable portion is secured after cutting by said seatable structure, further comprising a horizontally movable cutting portion slidably mounted on said seatable structure, said cutting portion including an air-driven motor for turning a shaft which has mounted at its end a rotating blade effective for severing said severable portion of said arrangement said cutting portion being remotely vertically position-settable, and said seatable portion being remotely couplable to the severable portion of said structure.

8. For use in an assembly of mechanical parts including a reference structure, a downwardly securable structure for being secured with respect to said reference structure and defining a horizontal bearing surface, an end-mountable beam for being held in said reference structure and defining a vertical threaded hole and including a downwardly threadable member for threading through said vertical threaded hole, said threadable member defining a lower bearing surface engageable with said horizontal bearing surface and having a circumferential flange adjacent said lower bearing surface, and a retaining means for holding said end-mountable beam in engagement with said downwardly securable structure, said retaining means including a mounted portion for being mounted on said downwardly securable structure, a retaining portion for engaging said end-mountable beam in holding action, and a vertical portion being disposed between said mounted and retaining portions; a remotely controllable tool for cutting said retaining means at said vertical portion and thereby permitting said end-mountable beam to be taken out of engagement with said downwardly securable structure, said tool comprising: base means including mounting means for seating with respect to said reference and said downwardly securable structures, a cutting means for severing said retaining portion from said mounted portion, a horizontally movable means mounted on said base means for supporting said cutting means, first latch means mounted on said base means for coupling engagement with said retaining portion, whereby said retaining portion is secured for cutting.

9. The tool of claim 8, wherein said cutting means is vertically adjustable in position.

10. The tool of claim 8, wherein said first latch means includes a vertical plate pivotally mounted with respect to said base means and defining first and second vertically spaced bays respectively effective for coupling with said mountable beam and said retaining means, and an expandable linkage pivotally engaged between said vertical plate and base means, whereby the engagement of said spaced bays with said beam and retaining means is effected.

11. The tool of claim 10, wherein said expandable linkage includes a rotatable bolthead remotely controllable by rotation of a pole/socket arrangement to control the engagement of said spaced bays.

12. The tool of claim 8, wherein the position of said horizontally movable means is determinable by a rack and pinion gear arrangement.

13. The tool of claim 12, wherein said rack and pinion gear arrangement includes a remotely rotatable bolthead for positioning said horizontally movable means with a pole/socket arrangement.

14. The tool of claim 8, wherein said first latch means defines bays for coupling engagement of said end-mountable beam and said retaining means, and said horizontally movable means includes a rack and pinion gear arrangement for horizontally positioning said horizontally movable means, and said cutting means is vertically positionable; said first latch means, said rack and pinion gear arrangement, and the vertical position of said cutting means being remotely controllable with a pole/socket arrangement.

15. The tool of claim 8 or 14, wherein said cutting means includes a motor and a cutting wheel in engagement with said motor for driving said cutting wheel during cutting operation.

16. The tool of claim 15, wherein said motor is air driven.

17. The tool of claim 16, wherein said cutting wheel rotates in a horizontal plane.

18. The tool of claim 14, wherein said cutting means includes a rotatable bolthead and the adjustment in vertical position of said cutting means is effected by rotating said rotatable bolthead with a pole/socket arrangement.

19. The tool of claim 8 or 14, wherein said cutting means includes a cutting wheel.

20. The tool of claim 19, wherein said cutting wheel rotates horizontally.

21. The tool of claim 19, wherein said cutting wheel is diamond-impregnated.

22. The tool of claim 8 or 14, further comprising a second latch means mounted on said base means for engagement with said reference structure for secure seating of said base means with respect to said reference structure.

23. The tool of claim 22, wherein said second latch means is hydraulically actuatable.

24. The tool of claim 8 or 14, further comprising a suction means for removing materials produced by cutting near the vicinity of said retaining means.

25. The tool of claim 24, wherein said suction means is mounted on said mounting means.

26. The tool of claim 24, wherein said cutting means travels in a spaced relationship with said suction means.

* * * * *